United States Patent
Matsushima (10) Patent No.: US 6,831,117 B2
(45) Date of Patent: Dec. 14, 2004

(54) HARDENER PARTICLE, MANUFACTURING METHOD FOR HARDENER PARTICLE AND ADHESIVE

(75) Inventor: Takayuki Matsushima, Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 0 days.

(21) Appl. No.: 10/310,517

(22) Filed: Dec. 5, 2002

(65) Prior Publication Data

US 2004/0110004 A1 Jun. 10, 2004

(51) Int. Cl.$^7$ .............................. C08K 9/06; B32B 25/20
(52) U.S. Cl. ...................... 523/213; 523/212; 523/216; 428/391; 428/405; 428/447; 428/450
(58) Field of Search .................... 528/416; 525/476; 428/391, 447, 405, 450; 523/212, 213, 216, 403, 440; 427/216, 220, 387

(56) References Cited

U.S. PATENT DOCUMENTS

| | | | |
|---|---|---|---|
| 4,324,873 A | | 4/1982 | Wada et al. |
| 4,923,945 A | * | 5/1990 | Isozaki et al. ................ 528/16 |
| 5,026,793 A | * | 6/1991 | Nakai et al. ................ 525/476 |
| 5,218,018 A | * | 6/1993 | Tominaga et al. .......... 523/412 |
| 5,739,180 A | * | 4/1998 | Taylor-Smith .............. 523/203 |
| 5,786,435 A | * | 7/1998 | Marutani et al. ........... 526/273 |
| 5,821,314 A | | 10/1998 | Ikushima et al. |
| 5,855,821 A | * | 1/1999 | Chau et al. ................. 252/514 |
| 5,929,140 A | * | 7/1999 | Fujii et al. .................. 523/440 |
| 6,274,671 B1 | * | 8/2001 | Kageishi et al. ........... 525/101 |
| 6,329,058 B1 | * | 12/2001 | Arney et al. ................ 428/403 |
| 2002/0151627 A1 | | 10/2002 | Matsushima |
| 2003/0031786 A1 | | 2/2003 | Rumpler et al. |

FOREIGN PATENT DOCUMENTS

| | | |
|---|---|---|
| JP | 09-241607 | 9/1997 |
| JP | 2002-366047 A | 12/2002 |

OTHER PUBLICATIONS

88940—Filing Receipt, Specification and Drawings for related U.S. Appl. No. 10/309,637 (commonly owned by asignee).

88941—Filing Receipt, Specification and Drawings for related U.S. Appl. No. 10/309,688 (commonly owned by asignee).

* cited by examiner

Primary Examiner—Jeffrey B. Robertson
(74) Attorney, Agent, or Firm—Welsh & Katz, Ltd.

(57) ABSTRACT

With the hardener particle of the present invention, because siloxane or an alkoxy group is bonded to a central metal located on a surface, an adhesive prepared by dispersing the hardener particles in an epoxy resin together with a silane coupling agent hardly causes reaction between the hardener particles and the silane coupling agent at ambient temperature whereby the preserving property of the adhesive is high. Because no siloxane is bonded to metal chelate or metal alcoholate at the part other than the surface of the hardener particles, the hardener particles are broken when the adhesive is heated, and the metal chelate and the metal alcoholate on the part other than the surface of the hardener particles reacts with the silane coupling agent to form cation, thereby polymerizing the epoxy resin with the cation to harden the adhesive even at low temperature within shorter time.

6 Claims, 9 Drawing Sheets

HARDENER PARTICLE, MANUFACTURING METHOD FOR HARDENER PARTICLE AND ADHESIVE

BACKGROUND OF THE INVENTION

1. Field of the Invention

The present invention relates to an adhesive and, more particularly, to a hardener particle used for an adhesive by which semiconductor chip and TCP (tape carrier package) are connected to substrates by means of a thermal compression bonding.

2. Description of Related Art

Adhesives containing an epoxy resin as a thermosetting resin have been conventionally used in connecting semiconductor chips onto a substrate or in manufacturing electric apparatuses by connecting TCP to LCD (liquid crystal display).

Figure 9:
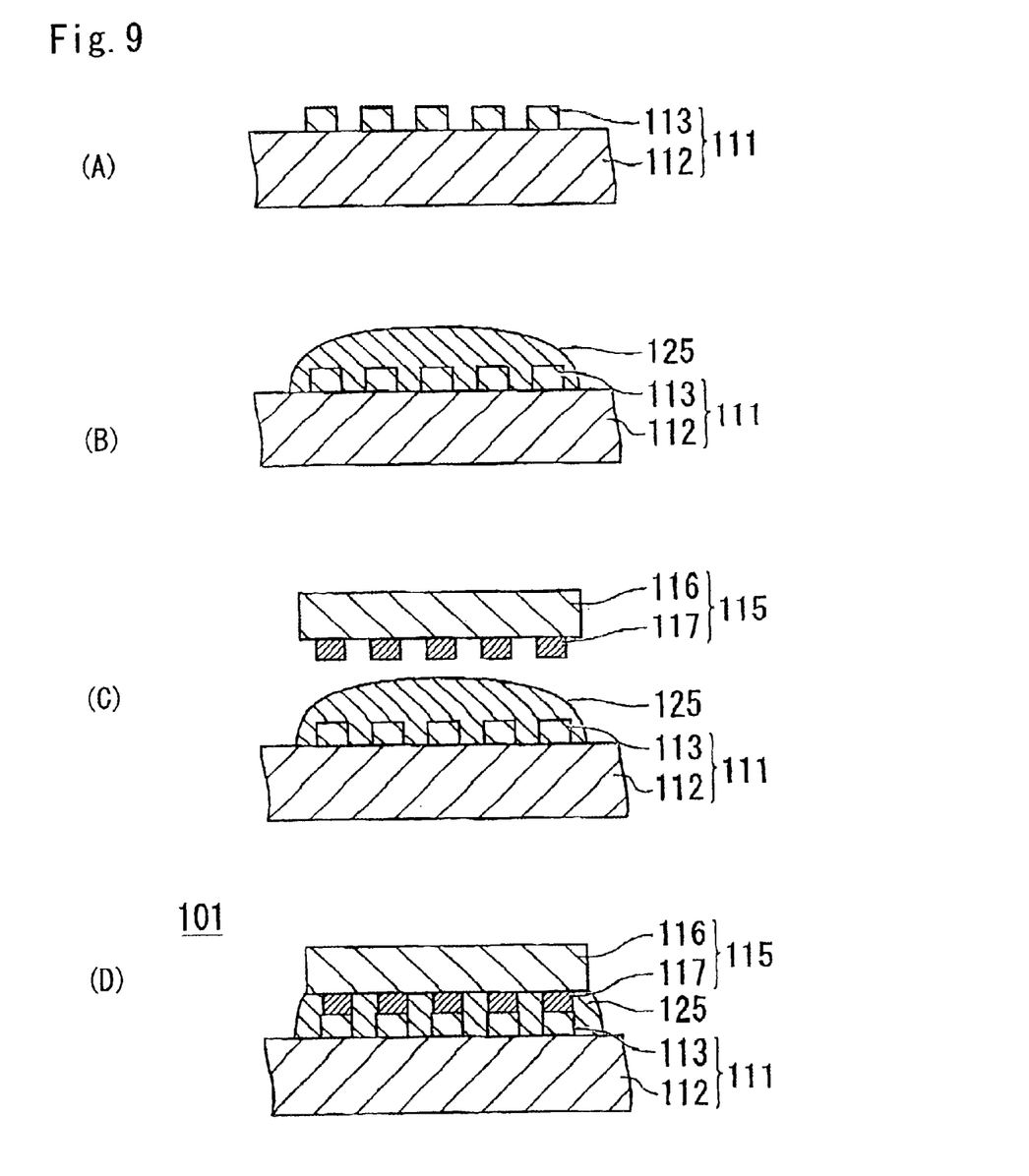
FIGS. 9A to 9D are illustrations showing the steps for connecting the TCP with the LCD using an adhesive of the prior art.

The reference numeral 111 in FIG. 9A shows an LCD, and the LCD 111 has a glass substrate 112 and ITO (indium tin oxide) electrodes 113 arranged on the glass substrate 112. In connecting the LCD 111 to a TCP which will be mentioned later, an adhesive is firstly applied on the surface of the side to which the ITO electrodes 113 of the LCD 111 are arranged. The reference numeral 125 in FIG. 9B shows an adhesive applied on the LCD 111.

The reference numeral 115 in FIG. 9C shows a TCP, and the TCP 115 has a base film 116 and metal wirings 117 arranged on the surface of the base film 116. The side on which the metal wirings 117 of the TCP 115 are arranged is disposed to an adhesive 125 on the LCD 111, and after being positioned, the side to which the metal wirings 117 of the TCP 115 are arranged are arranged is pushed to the adhesive 125.

When heated as pushed in such a state, the adhesive 125 softens, and the metal wirings 117 push away the softened adhesive 125, thereby attaching to the surface of the ITO electrodes 113.

A hardener such as imidazole polymerized of an epoxy resin by heating is generally added to the adhesives mentioned as above, and when heating is further continued in a state where the metal wirings 117 are attached to the ITO electrodes 113, the epoxy resin is polymerized by a catalytic reaction of the hardener to harden the adhesive 125.

The reference numeral 101 in FIG. 9D shows an electric apparatus in a state where the adhesive 125 is hardened. In the electric apparatus 101, the TCP 115 and the LCD 111 are fixed by the hardened adhesive 125 while the metal wirings 117 are attached to the ITO electrodes 113. Accordingly, the TCP 115 and the LCD 111 are connected to each other electrically and mechanically.

However, when the above adhesive is hardened, it is necessary to heat the adhesive at the temperature of as high as not lower than 180° C. and, if the pattern of the metal wiring 117 is fine, there may be the case where deformation such as elongation or warp is resulted in the TCP 115 upon heating. Such a problem may be solved when heating temperature is lowered but time required for the heating treatment becomes longer and productivity lowers.

With regard to adhesives having excellent hardening property at low temperature, radically polymerizable resins such as acrylate and adhesives where a radical polymerization initiator have been developed in recent years but such adhesives are inferior in electric characteristics and heat resistance in a hardened state to an adhesive using an epoxy resin.

The present invention has been created for solving the above-mentioned inconveniences in the prior art, and its object is to provide an adhesive able to be hardened under the condition of lower temperature and short time and also has excellent preserving property.

The inventor of the present invention has paid an attention to a means where commonly used hardeners are not used but an epoxy resin is subjected to a cationic polymerization and carried out the investigation repeatedly and, as a result, it has been that, when a silane compound having at least one alkoxy group in a structure (a silane coupling agent) and a metal chelate (or a metal alcoholate) are added to an adhesive, silanol where the silane coupling agent is hydrolyzed and cation where the metal chelate is reacted are produced and then the epoxy resin is polymerized by the cation.

The step of hardening of the epoxy resin by an adhesive to which metal chelate and silane coupling agent are added will be illustrated by the following reaction formulae (5) to (8).

Reaction Formula (5)

Reaction Formula (6)

Reaction Formula (7)

Reaction Formula (8)

As shown in the reaction formula (5), a silane compound having at least one alkoxy group reacts with water in the adhesive whereupon the alkoxy group is hydrolyzed to give a silanol group.

When the adhesive is heated, the silanol group reacts with metal chelate such as aluminum chelate and the silane compound is bonded to the aluminum chelate (the reaction formula (6)).

After that, as shown in the reaction formula (7), another silanol remaining in the adhesive in an equilibrium reaction is arranged to the aluminum chelate to which the silanol is bonded whereupon Bronsted acid points are produced and, as the reaction formula (8) shows, an epoxy ring located at the end of the epoxy resin is opened by the activated proton and is polymerized with an epoxy ring of another epoxy resin (cationic polymerization). As such, when a silane coupling agent and a metal chelate are added to an adhesive, a thermosetting resin such as epoxy resin is cationically polymerized. Since the reactions as shown by the reaction formulae (6) to (8) proceed at lower temperature than the temperature (180° C.) at which the conventional adhesives are hardened, the adhesive as mentioned above hardens at lower temperature within shorter time than in the case of the conventional ones.

However, a silane coupling agent is apt to be hydrolyzed and, in addition, reactivity of the silanol with a metal chelate or a metal alcoholate is high. Therefore, when a powdery metal chelate or metal alcoholate is directly dispersed to an adhesive as hardener particles, polymerization reaction of an epoxy resin proceeds even at ambient temperature and preservation property of the adhesive becomes poor.

The present inventor has carried out further intensive investigation and, as a result, it has been found that preserving property of the adhesive becomes high when a compound having hydroxyl group such as alcohol or a silane coupling agent is contacted to the surface of the hardener particles before addition of the hardener particles to an adhesive so that the compound is made to react with the central metal of the surface of the hardener particle.

SUMMARY OF THE INVENTION

The present invention has been constituted on the basis of the above-mentioned findings. A hardener particle mainly according to the invention includes either metal chelate where at least one ligand is coordinated to central metal or a metal alcoholate where at least one alkoxy group is bonded to central metal or both, wherein silicon is bonded to the central metal located on the surface of the hardener particles via oxygen.

In a preferred embodiment, the silicon is bonded to the central metal are bonded to each other via oxygen. A substituent bonded to the silicon may be represented by the following formula (1) or formula (2)

Formula (1)

(the substituent $X^1$ in the above formula is bonded to the silicon),

Formula (2)

(at least one substituent among the substituents $X^2 \sim X^4$ in the above formula (2) is bonded to the silicon)

Herein, exemplified as substituent $X^1$ are, e.g., $-CH_2CH_2CH_2-$, $-CH_2CH_2CH_2NHCH_2CH_2-$, $-CH_2CH_2CH_2NHC(=O)-$. Exemplified substituents $X^2$ to $X^4$ are, e.g., phenyl group, H, $-(CH_2)_n-$ (n is integer). The substituents $X^2$ to $X^4$ coupling to silicon, among them, can be, e.g., $-CH_2CH_2CH_2NHCH_2CH_2-$, $-CH_2CH_2CH_2NHC(=O)-$.

In another aspect of the invention, a hardener particle mainly includes either metal chelate where at least one ligand is coordinated to central metal or a metal alcoholate where at least one alkoxy group is coordinated to central metal or both, and the hardener particles in which carbon is bonded to the central metal located on the surface of the hardener particles via oxygen.

In further aspect of the invention, a manufacturing method for a hardener particle, includes the steps of forming silanol in hydrolyzing a silane coupling agent represented by the following formula (3)

(Formula 3)

(at least one of the substituents $X^5 \sim X^8$ in the above formula (3) is an alkoxy group), and forming a siloxane represented by the following formula (4)

Formula (4)

(in the above formula (4), oxygen which is bonded to silicon is bonded to the central metal) upon contacting hardener particles mainly comprising either or both of a metal chelate in which at least one ligand is bonded to a central metal or a metal alcoholate in which at least one alkoxy group is bonded to a central metal to the above silanol to react the central metal located on the surface of the hardener particles with the above silanol.

According to a preferred embodiment, with the manufacturing method for the hardener particle, an epoxy resin is made to react with at least one substituent among the substituents $X^9 \sim X^{11}$ bonding to silicon of the siloxane represented by the above formula (4); the substituent reacting with the epoxy resin has an amino group in its structure.

In yet another aspect of the invention, a manufacturing method for a hardener particle includes the steps of contacting hardener particles mainly including either or both of a metal chelate in which at least one ligand is coordinated to a central metal or a metal alcoholate in which at least one alkoxy group is bonded to a central metal to a compound having a hydroxyl group, and reacting the central metal located on the surface of the hardener particles with the compound having a hydroxyl group.

In a preferred embodiment, the compound having a hydroxyl group may include an alcohol; the alcohol may include tripropylene glycol.

In another aspect, an adhesive according to the invention, has a thermosetting resin, a silane coupling agent, and the hardener particle as set forth above.

DETAILED DESCRIPTION OF THE PREFERRED EMBODIMENTS

The present invention is constituted as mentioned above and, when a silane coupling agent represented by the formula (3) is contacted to the surface of hardener particles, an alkoxy group of the silane coupling agent is firstly hydrolyzed to give silanol, the silanol is dehydrated and condensed to a metal chelate or a metal alcoholate located on the surface of the hardener particles and central metal of the metal chelate or the metal alcoholate is bonded to silicon of the silanol via oxygen (siloxane bond) to give the hardener particles of the present invention.

Incidentally, although a silane coupling agent is also hydrolyzed by moisture adhered on the surface of the hardener particles or by moisture in air, it is preferred for a quicker treatment that an already-silanolated product by adding water to a silane coupling agent is used for the reaction with the hardener particles.

Since siloxane is bonded to a central metal located on the surface of the hardener particles of the present invention, the silane coupling agent in the adhesive does not react with the hardener particles at ambient temperature and the adhesive does not harden when the hardener particles of the present invention are added to an adhesive while, when the adhesive is thermally adhered with pressure, the hardener particles are thermally expanded by heating, the thermally expanded hardener particles are broken by a physical impacts such as pressure and the parts other than the surface of the hardener particles are exposed.

Since no siloxane is bonded to the central metal located on the parts other than the surface of the hardener particles, an epoxy resin is polymerized by cation (cationic polymerization) and the adhesive hardens when the central metal reacts with the silane coupling agent in the adhesive and cation is produced. As such, the hardener particles of the present invention have a function of the so-called latent hardener.

In addition, temperature where a silane coupling agent reacts with a metal alcoholate or a metal chelate is lower than the temperature where the conventional adhesive is thermally hardened (180° C. or higher) and, therefore, the adhesive of the present invention hardens at lower temperature within shorter time than the conventional adhesive.

Incidentally, cation is also produced in a step where the central metal on the surface of the hardener particles reacts with a silane coupling agent and, therefore, when the hardener particles immediately after siloxane is formed on the surface are added to an adhesive, there is an anxiety that the adhesive hardens at ambient temperature by the cation remaining on the surface of the hardener particles. However, when the hardener particles are washed with water or an organic solvent before adding to the adhesive, it is possible to remove the remaining cation, an excessive silane coupling agent, etc. from the hardener particles.

When an aminosilane coupling agent having the substituent other than an alkoxy group has an amino group is used, siloxane having an amino group is produced. When an epoxy resin is further contacted to the hardener particles in such a state, an amino group in siloxane reacts with an epoxy ring in epoxy resin and the epoxy resin is bonded to siloxane. Accordingly, the structure of siloxane on the surface of the hardener particle becomes more complicated whereby the mechanical strength of the hardener particles becomes higher.

When a compound having a hydroxyl group such as alcohol is contacted to the surface of the hardener particles instead of a silane coupling agent, a metal chelate or a metal alcoholate on the surface of the hardener particles carries out a dehydrating condensation with a hydroxyl group of the compound whereupon the central metal located on the surface of the hardener particles is bonded to the compound via oxygen. The hardener particles prepared as such have a function as a latent hardener as same as in the case where siloxane is formed.

Although when alcohol is used as a compound having a hydroxyl group, there is no particular limitation for the type of the alcohol, when a monohydric alcohol is used as an alcohol, a cross-linking structure is hardly formed on the surface of the hardener particles and the molecule bonding to the central metals becomes a one-dimensional straight chain. In that case, rigidity of the filmy molecule covering the surface of the hardener becomes low. However, when a monohydric alcohol having a highly reactive functional group is used, it is possible that the rigidity of the filmy molecule on the surface of the hardener particles is made high by means of the reaction of the functional group with other substance.

As to a compound having a hydroxyl group, a carboxylic acid, for example, may be used.

When a thermoplastic resin is added to an adhesive, cohesive force of the adhesive increases due to the property of the thermoplastic resin and, therefore, adhesive property of the adhesive becomes higher. When a thermoplastic resin having a high polarity is used, it is not only that the thermoplastic resin is incorporated into a hardening reaction of the resin component but also that the resin is bonded to an inorganic material via a silane coupling agent whereby an adhesive having a high hardening property and having a high affinity to a thing to be adhered comprising an inorganic material is obtained.

As hereunder, the adhesive of the present invention will be illustrated in detail.

Figure 1:
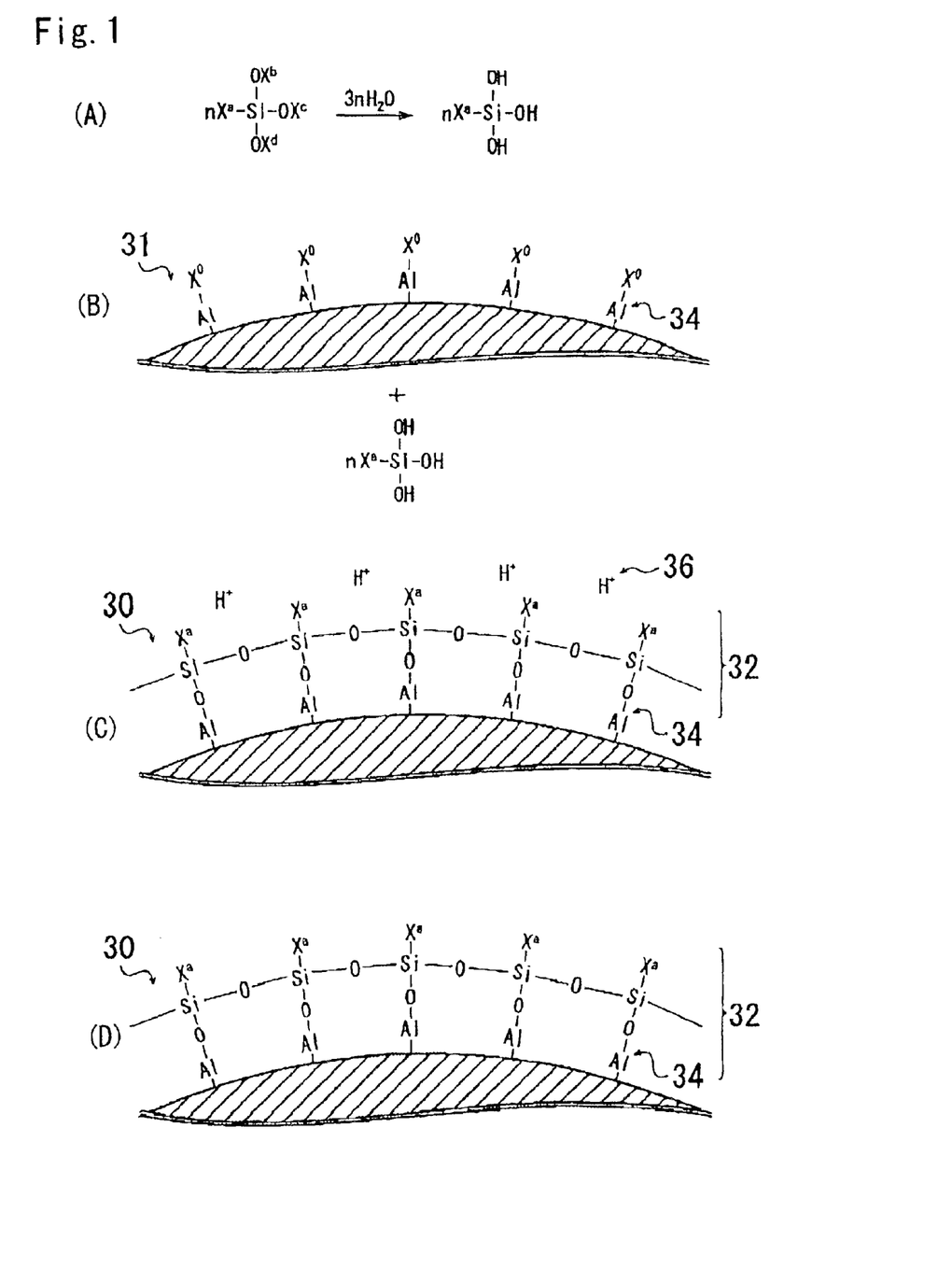
FIGS. 1A to 1D are illustrations showing the steps for manufacturing a hardener particle which is the first example of the present invention.

The left side of the reaction formula shown by FIG. 1A shows an example of a silane coupling agent used in the present invention. The silane coupling agent has four substituents, $X^a$–$X^d$, and three of them, $X^b$–$X^d$, are bonded to silicon of the silane coupling agent via oxygen. Accordingly, this silane coupling agent has three alkoxy groups.

After the silane coupling agent is heated at predetermined temperature, hardener particles comprising a powdery metal chelate or metal alcoholate (here, the central metal comprises aluminum) are dispersed in the silane coupling agent and the silane coupling agent is stirred by heating at predetermined temperature.

When moisture in air or moisture adhered to the surface of the hardener particles contacts to a silane coupling agent, each of the three alkoxy groups in the silane coupling agent is hydrolyzed to give a hydroxyl group. Right side of the reaction formula of FIG. 1A shows silanol produced by hydrolysis of the silane coupling agent.

The reference numeral 31 in FIG. 1B shows hardener particles dispersed in a silane coupling agent. The reference numeral 34 in the same drawing shows a central metal (here, aluminum) located on the surface of the hardener particles 31 and a substituent $X^0$ is bonded to the central metal 34. When the hardener particles 31 comprise aluminum chelate, the substituent $X^0$ is a ligand while, when the hardener particles 31 comprise aluminum alcoholate, the substituent $X^0$ is an alkoxy group.

When a silane coupling agent is continued to stir by keeping at predetermined temperature, the central metal 34 on the surface of the hardener particles 31 reacts with silanol produced by hydrolysis of a silane coupling agent and silicon of silanol is bonded to the central metal 34 via oxygen to give siloxane. At that time, the silanol reacts with other silanol to form polysiloxane on the surface of the hardener particles 31.

FIG. 1C shows such a state and the reference numeral 32 in the same drawing shows polysiloxane formed on the surface of the hardener particles 31. Each silicon in the polysiloxane 32 is bonded to the central metal 34 located on the surface of the hardener particles 31 and, as a result, siloxane which is a constituent unit of the polysiloxane 32 is arranged on the surface of the hardener particles 31 in a form of a monomolecular layer. Since silicons of the polysiloxane 32 are bonded each other via oxygen, mechanical strength of polysiloxane 32 is high.

After that, the hardener particles 31 in a state where polysiloxane 32 is formed are pulled out from the silane coupling agent. In that state, cation 36 (hydrogen ion) formed upon the reaction of the silane coupling agent and the central metal and an excess silane coupling agent (including silanol as well) which is not bonded to the central metal remain on the surface of the polysiloxane 32.

When the hardener particles 32 in such a state are washed with water, the remaining cation 36 and silane coupling agent are removed to give the hardener particles 30 of the first example of the present invention (FIG. 1D).

Now an illustration will be made for the adhesive of the present invention using the hardener particles 30 of the first example of the present invention and a step for manufacturing an electric apparatus using the adhesive of the present invention. Firstly, epoxy resin which is a thermosetting resin, thermoplastic resin, silane coupling agent, the hardener particles 30 of the first example of the present invention, electrically conductive particles and solvent were mixed and stirred in a predetermined compounding ratio to prepare a pasty adhesive.

Since polysiloxane 32 is bonded to the central metal 34 on the surface of the hardener particle 30 in such a state, reaction of the silane coupling agent in the adhesive with the central metal 34 does not take place and cation is not formed. Cation remained in polysiloxane 32 is removed as well. Accordingly, no cationic polymerization reaction of the epoxy resin takes place in the adhesive and the adhesive does not harden at ambient temperature.

Figure 2:
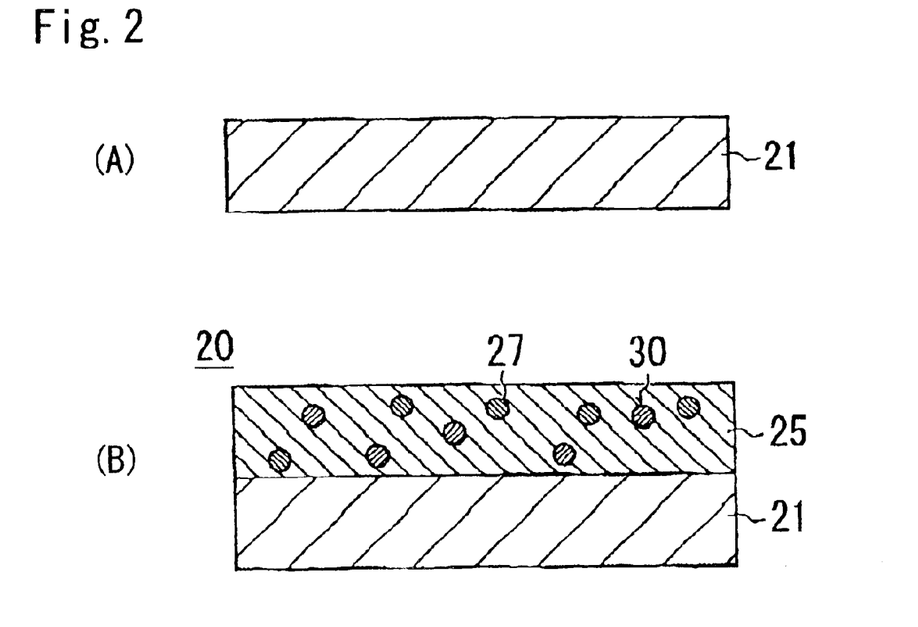
FIGS. 2A and 2B are illustrations showing rate one example of the steps for manufacturing an adhesive film using the hardener particles of the present invention.

The reference numeral 21 in FIG. 2A shows a releasing film. When the adhesive in a predetermined amount is applied on the surface of the releasing film 21 and dried, solvent in the adhesive is evaporated whereupon a coated layer 25 of the adhesive is formed (FIG. 2B)

The reference numeral 21 in FIG. 2B shows an adhesive film in a state where the coated layer 25 is formed. The reference numeral 27 in the same drawing shows an electroconductive particle which is dispersed in the adhesive together with the latent hardener 30.

Figure 3:
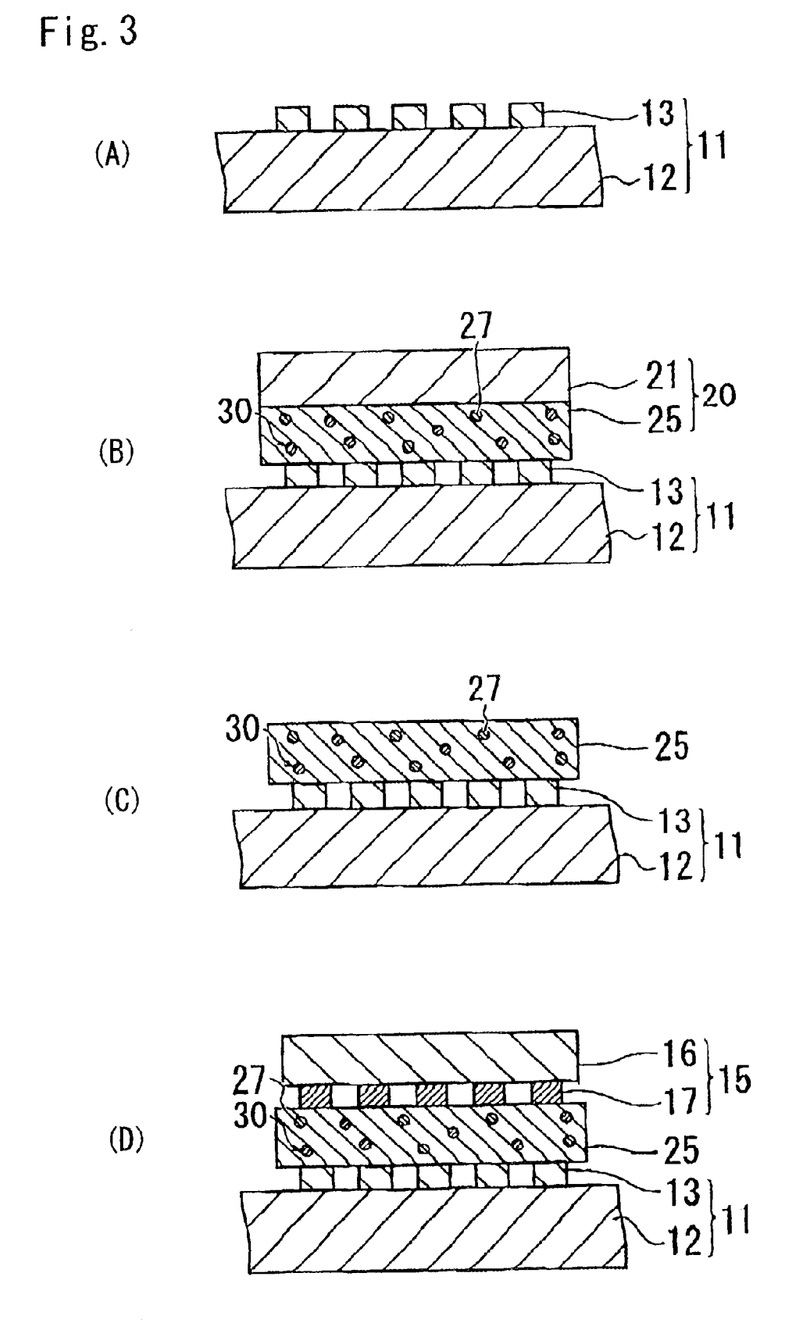
FIGS. 3A to 3D are illustrations showing the first half of the step for connecting an LCD to a TCP using the adhesive of the present invention.

The reference numeral 11 in FIG. 3A shows LCD and the LCD 11 has a glass substrate 12 and a plurality of ITO electrodes 13 (indium tin oxide) formed on one side of the glass substrate 12. In this drawing, five ITO electrodes 13 are shown.

The coated layer 25 of an adhesive film 20 shown in FIG. 2B is pushed and attached to the part of the surface whereto TCP which will be mentioned later among the surfaces where ITO electrodes 13 of the LCD 11 are formed (FIG. 3B). Adhesive force of a releasing film 21 to the coated layer 25 is made smaller than that of a coated layer 25 to ITO electrodes 13 and, therefore, the coated layer 25 remains on the LCD 11 when the releasing film 21 is released (FIG. 3C).

Figure 5:
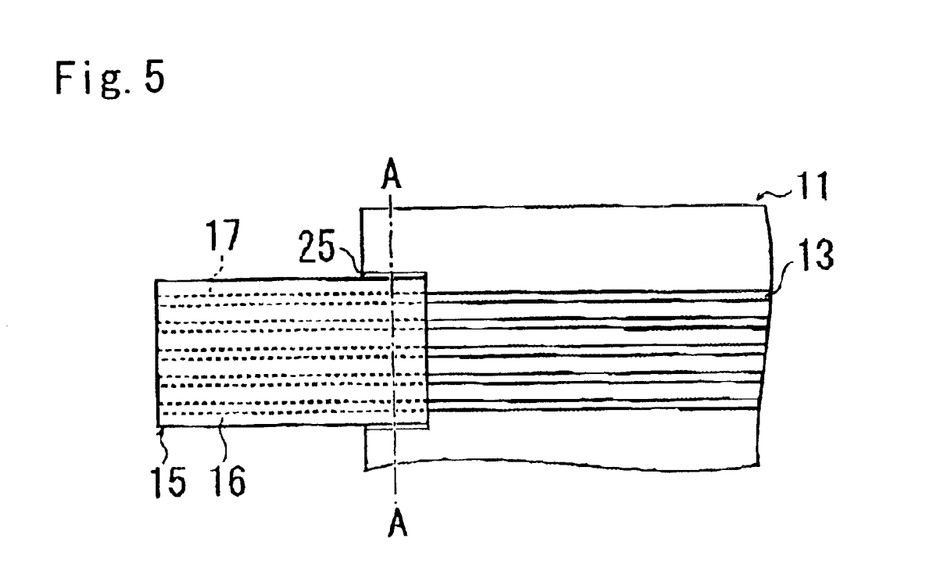
FIG. 5 is a plane figure which illustrates the state of positioning of the TCP on the LCD.

The reference numeral 15 in FIG. 5 shows TCP. The TCP 15 has a long-sized base film 16 and, on one side of the base film 16, there are arranged a plurality of narrow metal wires 17 in the longitudinal direction of the base film 16 (here, five metal wires 17 are shown). Each end of the longitudinal direction of the metal wires 17 is positioned at each end of the longitudinal end of the base film.

FIG. 3D shows a cross-sectional view of FIG. 5 along the line A-A in which a surface of the side to which the metal wires 17 of the TCP 15 are arranged is faced to the side to which the ITO electrodes of the LCD 11 are arranged while an end of the TCP 15 is faced to the coated layer 25 of the surface of the ITO electrode 13 whereby there is positioned in such a manner that the ITO electrode 13 of the LCD 11 and the metal wiring 17 of the TCP 15 face each other.

Figure 4:
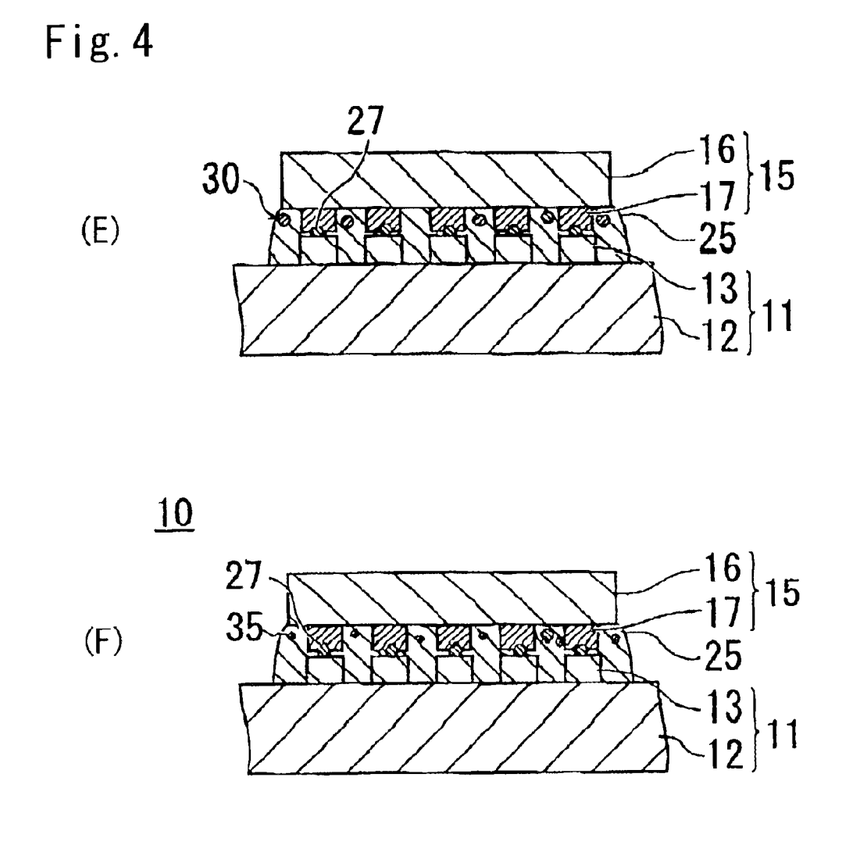
FIGS. 4E and 4F are illustrations showing the second half of the step for connecting the LCD to the TCP.

When the surface to which the metal wires 17 of the TCP 15 is pushed and attached to the coated layer 25 in such a state and the whole is heated together with pressing the part where the TCP and the LCD are overlapped, the coated layer 25 softens by heating, the metal wires 17 push away the softened coated layer 25 by means of the pressure and the electrically conductive particles 27 in the remained coated layer 25 are sandwiched between the metal wires 17 and the ITO electrodes 13 (FIG. 4E).

When heating with pressure is continued under such a state, the hardener particles 30 which are thermally expanded are broken by pressure and expansion, and the parts other than the surface of the hardener particles 30 are exposed. Since metal chelate or metal alcoholate in the part other than the surface of the hardener particle 31 is not bonded to siloxane, the silane coupling agent in the coated layer 25 reacts with the metal chelate or metal alcoholate when the broken hardener particles shown by the reference numeral 35 of FIG. 4F contact to a silane coupling agent in a coated layer 25 whereupon cation is produced.

An epoxy resin in the coated layer 25 is polymerized by cation (cationic polymerization) and the coated layer 25 hardens in such a state where the metal wiring 17 and the ITO electrode 13 sandwich the electrically conductive particle 27 (FIG. 4F).

The reference numeral 10 in FIG. 4F shows an electric apparatus in a state where the coated layer 25 is hardened. In the electric apparatus 10, it is not only that the metal wires 17 and the ITO electrodes 13 are electrically connected via electrically conductive particles 27 but also that the LCD 11 and the TCP 15 are mechanically connected by the hardened coated layer 25.

As such, in the adhesive of the present invention, it is not only that a preserving property is excellent but also an epoxy resin is hardened by cationic polymerization and, accordingly, the adhesive is able to be hardened at lower temperature within shorter time as compared with the case where conventional hardener is used.

As hereinabove, although there is illustrated a method where the hardener particles 31 are dispersed in a silane coupling agent the present invention is not limited thereto.

Figure 6:
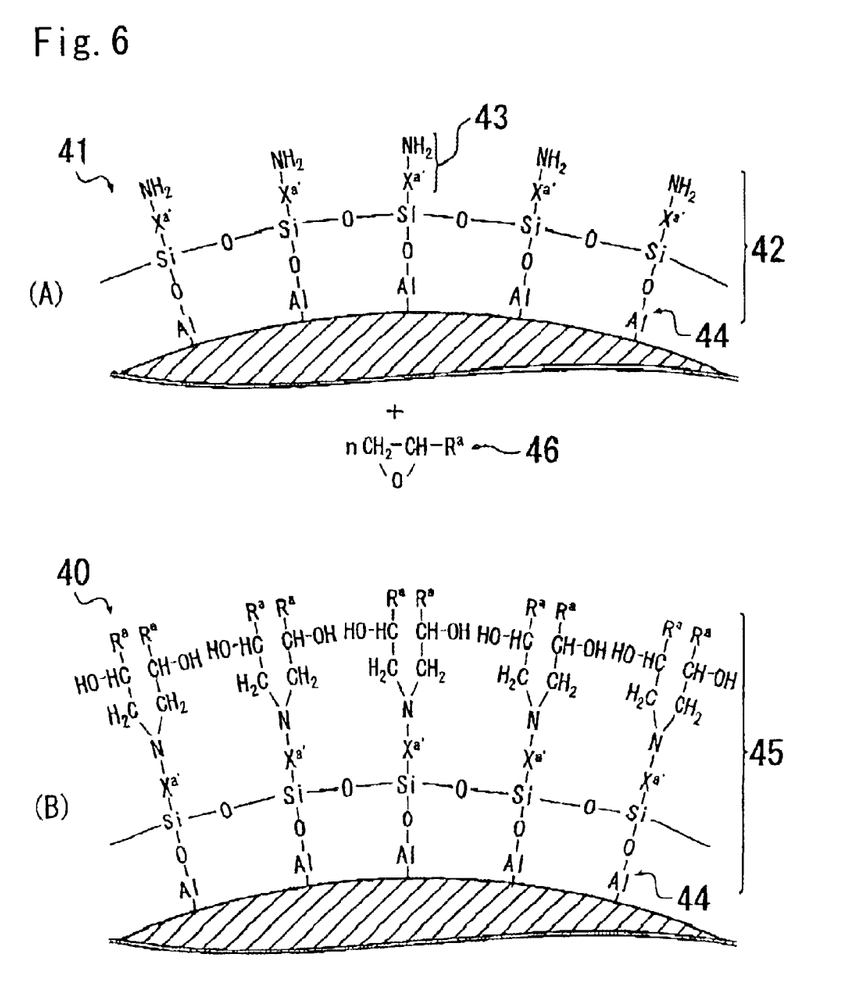
FIGS. 6A and 6B are illustrations showing the steps for manufacturing a hardener particle which is the second example of the present invention.

The reference numeral 41 in FIG. 6A shows a hardener particle as same as that shown in FIG. 1D and polysiloxane 42 formed in the same step as in FIG. 1A to 1D is bonded to the central metal 44 on the surface of the hardener particle 41. The reference numeral 43 in the same drawing shows a substituent which is directly bonded to silicon of polysiloxane 42 without the intermediation of oxygen and, here, the substituent 43 has a substituent $X^{a'}$ bonding to silicon and an amino group bonding to the end of the substituent $X^{a'}$. Accordingly, in such a state, an amino group is exposed on the surface of polysiloxane 42.

After heating an epoxy resin which is liquid at ambient temperature, it is kept hot at predetermined temperature and hardener particles 41 in a state of being shown by FIG. 6A are dispersed in the epoxy resin.

The reference numeral 46 in FIG. 6A shows a chemical formula of the epoxy resin. The epoxy resin 46 has a main skeleton $R^a$ and an epoxy ring bonding to the end of the main skeleton $R^a$ and, when the epoxy resin 46 contacts an amino group of polysiloxane 42 on the surface of the hardener particles 41, the amino group reacts with the epoxy resin 46 to give hardener particles 40 of the second example of the present invention. Here, the state of reaction of two epoxy rings of the epoxy resin 46 to an amino group is shown by means of a drawing.

The reference numeral 45 in FIG. 6B shows polysiloxane in such a state where the epoxy resin 46 is bonded. The polysiloxane 45 has more complicated structure as compared with a polysiloxane 42 shown in FIG. 6A and, therefore, mechanical strength of the hardener particles 40 of the second example of the present invention is high.

Hereinabove, there is illustrated a case where a silane coupling agent is made to react with the central metal on the surface of a hardener particle but the present invention is not limited thereto but alcohol, carboxylic acid and various kinds of resin (polymer, monomer, oligomer, etc.) may be also used so far as they have a functional group which reacts with a metal chelate or metal alcoholate constituting the hardener particle.

Figure 7:
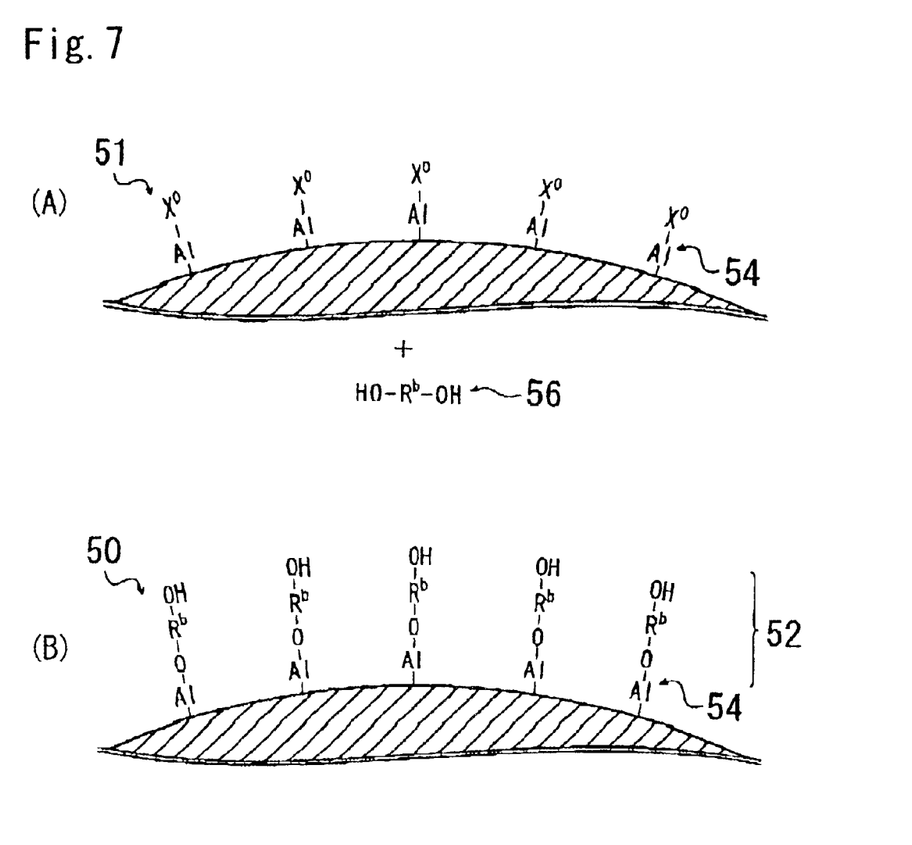
FIGS. 7A and 7B are illustrations showing the steps for manufacturing a hardener particle which is the third example of the present invention.

The reference numeral 56 in FIG. 7A shows an alcohol (diol) having two hydroxyl groups and the diol 56 has a main skeleton $R^b$ and two hydroxyl groups bonding to the main skeleton $R^b$. When hardener particles 51 in the same state as shown in FIG. 1B are dispersed in and stirred with the diol 56 kept warm at predetermined temperature, one of the two hydroxyl groups of the diol 56 reacts with the central metal 54 located on the surface of the hardener particles 51 as same as in the case shown in FIG. 1B to 1C.

The reference numeral 50 in FIG. 7B shows a hardener particle in such a state that an alkoxy group 52 is bonded to the central metal 54 by the reaction with the diol 56.

EXAMPLES

As a hardener particle 31, there was used aluminum acetylacetonate manufactured by Kawaken Fine Chemical K.K. which is a powdery metal chelate ("Alumichelate A(W)" (trade name); average particle size: 5 μm). The hardener particles 31 were dispersed in an aminosilane coupling agent ("A-1100" (trade name) manufactured by Nippon Unicar) heated at 40° C., stirring was carried out under the state where the aminosilane coupling agent was kept at 40° C. for 24 hours and, after the reaction, the hardener particles 31 were pulled out, washed with water and dried to give hardener particles 30 as shown in FIG. 1D which is the first example of the present invention.

After that, the above hardener particles 30 of the first example were dispersed in an epoxy resin of a bisphenol A type ("EP 828" (trade name) manufactured by Yuka Shell Epoxy K. K.) heated at 40° C., stirring was carried out by heating the epoxy resin at 40° C. and the hardener particles 41 were pulled out, dispersed in toluene which is an organic solvent and filtered to give hardener particles 40 of the second example of the present invention.

Apart from that, the same powdery metal chelate used for the above hardener particles 30 of the first example was used as hardener particles 51 and dispersed in diol (TPG (tripropylene glycol) manufactured by Asahi Glass). After stirring for 24 hours, the hardener particles 51 were pulled out and washed to give the hardener particles 50 of the third example of the present invention.

After that, each 2 parts by weight of the hardener particles 30, 40 and 50 of the first to the third examples, 50 parts by weight of a phenoxy resin (manufactured by Phenoxy Associates) which is a thermoplastic resin, 50 parts by weight of an epoxy resin of a bisphenol A type which is a thermosetting resin, 1 part by weight of an epoxy silane coupling agent ("A-187" (trade name) manufactured by Nippon Unicar) and 5 parts by weight of electrically conductive particles were mixed to prepare three kinds of adhesives.

Then adhesives 20 of Examples 1 to 3 were prepared by the step of FIGS. A and B using those three kinds of adhesives and each of the following "test upon preservation at room temperature" and "test upon preservation at 40° C." was carried out using the adhesive films 20 of Examples 1 to 3.

[Test Upon Preservation at Room Temperature]

After the TCP 15 and the LCD 11 were connected according to the steps of FIG. 3A to 3D and FIGS. 4E and 4F using the adhesive films 20 of Examples 1 and 2 and Comparative Examples 1 and 2, strength for releasing the TCP 15 from the LCD 11 was measured (initial releasing force). Apart from that, the adhesive films 20 of Examples 1 to 3 were preserved at room temperature (25° C.) for 1 day, 3 days and 7 days, the TCP 15 and the LCD 11 were connected by the same step using each of the adhesives films 20 after preservation and strength for releasing the TCP 15 from the LCD 11 was measured (releasing force after preservation).

Here, metal wires 17 having a width of 25 μm arranged at intervals of 25 μm were used for the TCP 15 while ITO electrode 13 having a sheet resistance of 10 ohms per $cm^2$ surface area was used for the LCD 11. The part where the TCP 15 and the LCD 11 were layered was heated for 10 seconds with a load of 3 MPa and the temperature of the coated layer 25 was raised up to 130° C. to connect.

[Test Upon Preservation at 40° C.]

The adhesive film 20 was preserved under the same condition as the above "test upon preservation at room temperature" except that the temperature for preserving the adhesive film 20 was changed from room temperature to 40° C. to connect the TCP 15 to the LCD 11 and then the strength for releasing after the preservation was measured.

In the above "test upon preservation at room temperature" and "test upon preservation at 40° C.", the case where the degree of the releasing force after the preservation was 90% or more of the initial releasing force was evaluated as "excellent", the case where that was from 80% or more but less than 90% was evaluated as "good", where that was from 70% or more but less than 80% was evaluated as "fair" and the case where that was less than 70% was evaluated as "poor" and the result of the evaluation is mentioned in the following Table 1.

TABLE 1

(Result of Evaluation Test)

|  | Preserved at room temperature for | | | Preserved at 40° C. for | | |
| --- | --- | --- | --- | --- | --- | --- |
|  | 1 day | 3 days | 7 days | 1 day | 3 days | 7 days |
| Example 1 | excellent | excellent | good | good | good | fair |
| Example 2 | excellent | excellent | excellent | excellent | excellent | excellent |
| Example 3 | excellent | excellent | excellent | excellent | excellent | good |
| Comp. Ex. 1 | good | fair | poor | poor | poor | poor |

Incidentally, Comparative Example 1 in the above Table 1 is the case where the hardener particles which were made in a state as shown in FIG. 1B as same as those used for the first to the third examples were not treated with a silane coupling or diol but were used as an adhesive as they were.

As will be apparent from the above Tables 1, Examples 1~3 where the hardener particles 30, 40 and 50 of the first to the third examples of the present invention were used showed higher evaluation results both in "test upon preservation at room temperature" and "test upon preservation at 40° C." as compared with Comparative Example 1 where the hardener particles of FIG. 1B were used as they were and the high preserving property of the adhesive using the hardener particles of the present invention was confirmed.

Particularly, the hardener particles 40 of the second example where the hardener particles 30 of the first example of the present invention were treated with an epoxy resin showed nearly no lowering in the adhesive force even preserved at 40° C. for 7 days as compared with the cases where the hardener particles 30 and 50 which were the first and the third examples were used.

As hereinabove, although there was illustrated the case where an adhesive film was prepared using an adhesive, the present invention is not limited thereto but, for example, an adhesive may used in a pasty form as it is.

Figure 8:
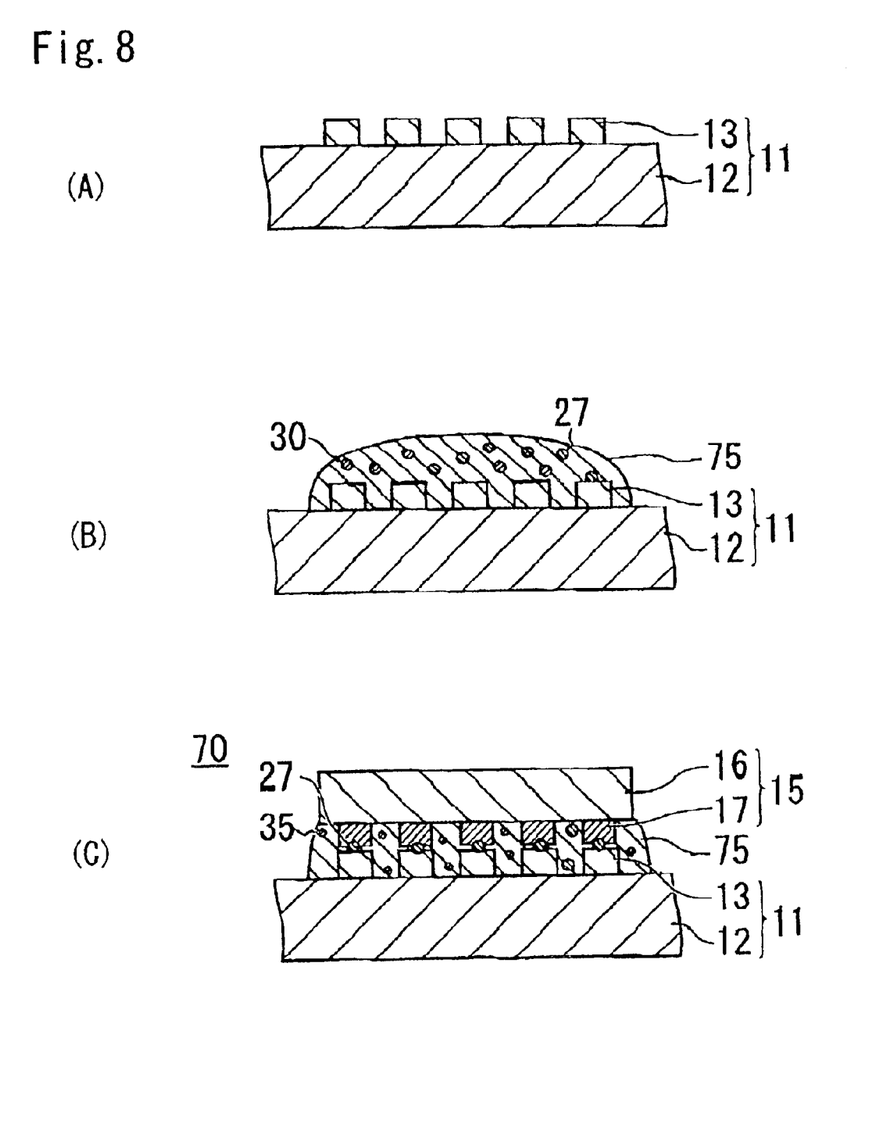
FIGS. 8A to 8C are illustrations showing another example of the steps for connecting the TCP with the LCD using the adhesive of the present invention.

The reference numeral 11 of FIG. 8A shows the same LCD as that shown in FIG. 3A and, in connecting the TCP 15 to this LCD 11, an adhesive was firstly applied to the part to which the TCP 15 is connected among the surface of the ITO electrode 13 of the LCD 11 whereupon a coated layer 75 of an adhesive is formed (FIG. 8B).

After that, positioning of the TCP 15 was carried out in the step of FIG. 3D and then the TCP 15 and the LCD 11 were connected in the steps of FIG. 4E and F whereupon an electric apparatus 70 was prepared (FIG. 8C).

As hereinabove, although there were illustrated the cases where the TCP 15 and the LCD 11 were connected using an adhesive, the present invention is not limited thereto but may also be used for the cases where various electric apparatuses are used such as a case where a substrate and a semiconductor chip are connected.

In addition, as hereinabove, although there were illustrated the cases where electrically conductive particles were dispersed in an adhesive, the present invention is not limited thereto but an adhesive containing no electrically conductive particle, for example, is covered by the present invention as well.

With regard to the central metal for a metal chelate or a metal alcoholate constituting the hardener particles, various ones such as zirconium, titanium and aluminum may be used and, among them, a particularly highly reactive aluminum is preferably used for the central metal.

As hereinabove, although there were illustrated the cases where an epoxy resin was used for a thermosetting resin, the present invention is not limited thereto. Various ones such as urea resin, melamine resin, phenol resin, vinyl ether resin and oxetane resin may be used so far as they are resins which are able to be cationically polymerized and, when strength of the adhesive after thermosetting, etc. are taken into consideration, the use of an epoxy resin is preferred.

With regard to a silane coupling agent used in the present invention, it is preferred to use that which is shown by the following formula (9).

Formula (9)

(In the above formula (9), at least one of the substituents $X^{12}$~$X^{15}$ is an alkoxy group. Among the substituents $X^{12}$~$X^{15}$ besides an alkoxy group, at least one is preferably that which has epoxy ring or vinyl group and, particularly preferably, a substituent having an epoxy ring is glycidyl group.

With regard to a thermoplastic resin, various ones other than phenoxy resin such as polyester resin, polyurethane resin, polyvinyl acetal, ethylene vinyl acetate and rubbers (e.g., polybutadiene rubber) may be used as well. It is also possible to add various additives such as aging preventer, filler and coloring agent to the adhesive of the present invention.

As hereinabove, there were illustrated the cases where an aminosilane coupling agent in which a substituent other than an alkoxy group has an amino group is used as a silane coupling agent to be contacted to hardener particles, although the present invention is not limited thereto. With regard to a silane coupling agent, there may be used those where the substituent other than an alkoxy group has various substituents such as vinyl group, epoxy group, methacryl group, mercapto group and isocyanate group.

Moreover, the substance which is made to react with the hardener particles of the first example of the present invention is not also limited to an epoxy resin, For example, when hardener particles of the first example are prepared using a silane coupling agent where, for example, a substituent other than an alkoxy group has an isocyanate group, a reaction between isocyanate and diol takes place whereby a urethane resin is formed on the surface of the hardener particle in case diol is used instead of an epoxy resin.

As such, there is no particular limitation for a combination of a substance to be made to react with polysiloxane and a type of a silane coupling agent but that is decided depending upon the type of a substituent of the silane coupling agent.

As hereinabove, there were illustrated the cases where hardener particles 31, 41 or 51 are dispersed in a silane coupling agent and a diol, and the hardener particles 31, 41 or 51 are contacted to the silane coupling agent or the diol. However, the present invention is not limited thereto but, for example, there may be carried out that a silane coupling agent or a diol is sprayed on hardener particles so that the silane coupling agent or the diol is contacted to the hardener particles.

Advantages of the present invention are that, since siloxane or alkoxy group is bonded to the central metal located on the surface of the hardener particles of the present invention, no reaction of the hardener particles with a silane coupling agent takes place in an adhesive. In addition, the adhesive of the present invention hardens by a cationic polymerization reaction of an epoxy resin. Since a cationic polymerization reaction takes place at lower temperature than the polymerization reaction using the conventional hardener, the adhesive of the present invention hardens at lower temperature within a shorter time than in the case of the conventional adhesive.

What is claimed is:

1. A hardener particle mainly comprising either or both of a metal chelate in which at least one ligand is coordinated to central metal and a metal alcoholate in which at least one alkoxy group is bonded to central metal,
wherein silicon is bonded to the central metal and to adjacent silicons via oxygen and located on the surface of the hardener particles.

2. The hardener particle according to claim 1, wherein a substituent represented by the following formula (1) is bonded to the silicon Formula (1)

wherein the substituent $X^1$ in the above formula is bonded to the silicon and comprises —$CH_2CH_2CH_2$—, —$CH_2CH_2CH_2NH$ $CH_2CH_2$, or $CH_2CH_2CH_2NHC$(=O)—.

3. The hardener particle according to any of claim 1, wherein a substituent represented by the following formula (2) is bonded to the silicon Formula (2)

wherein at least one substituent among the substituents $X^2$–$X^4$ in the above formula (2) is bonded to the silicon and $X^2$, $X^3$, and $X^4$ may be —$CH^2CH_2CH_2NHCH_2CH_2$— or $CH_2CH_2CH_2NHC$(=O)—.

4. A manufacturing method for hardener particles comprising the steps of:
Forming silanol in hydrolyzing a silane coupling agent represented by the following formula (3)

Formula (3)

wherein $X^5$–$X^8$ comprise at least one alkoxy group and a substituents other than the alkoxy group being being selected from the group consisting of a vinyl group, an epoxy group a methacrylate group, a mercapto group and an isocyanate group; and forming a siloxane represented by the following formula (4) upon containing hardener particles mainly comprising either or both of a metal chelate in which at least one ligand is bonded to a central metal or a metal alcoholate in which at least one alkoxy group is bonded to a central metal to the above silanol to react the central metal located on the surface of the hardener particles with the above silanol Formula (4)

wherein oxygen which is bonded to silicon is bonded to the central metal), and reacting an epoxy resin with at least one substituent among the substituents $X^9$–$X^{11}$ bonding to silicon of the siloxane represented by the formula (4) where $X^9$–$X^{11}$ comprises at least one alkoxy group and a substituent other than the alkoxy group being selected from the group consisting of a vinyl group, an epoxy group, methacrylate group, a mercapto group and an isocyanate group.

5. A manufacturing method for the hardener particles where hardener particles mainly comprising a metal chelate where at least one ligand is coordinated to a central metal or a metal alcoholate where at least one alkoxy group is bonded to a central metal or both are made contacted to a tripropylene glycol whereby the central met located on the surface of the hardener particles is made to react with tripropylene glycol.

6. An adhesive having a thermosetting resin, a silane coupling agent and the hardener particles of in claim 1.

* * * * *